United States Patent Office

3,580,892
Patented May 25, 1971

3,580,892
PROCESS FOR POLYMERIZING CYCLOPENTENE
Peter Gunther, Opladen, Wolfgang Oberkirch, Cologne-Stammheim, and Gottfried Pampus, Leverkusen, Germany, assignors to Farbenfabriken Bayer Aktiengesellschaft, Leverkusen, Germany
No Drawing. Filed Nov. 5, 1969, Ser. No. 874,399
Claims priority, application Germany, Dec. 3, 1968,
P 18 12 338.1
Int. Cl. C08f 5/00
U.S. Cl. 260—93.1                                 8 Claims

ABSTRACT OF THE DISCLOSURE

A catalyst made from (1) a rhenium compound and (2) an aluminum organic compound polymerises cyclopentene to yield rubber-like products with high content of cis-linkages.

---

It is known that cyclopentene can be polymerised with organometallic catalysts of tantalum, niobium, molybdenum or tungsten salts and organo-aluminum compounds. Reaction proceeds with ring opening to form linear unsaturated polymers. The products which are usually formed have all or most of the double bonds in the trans-configuration.

According to British patent specifications 1,010,860 and 1,062,367, polymers having predominantly cis-structure are obtained with catalysts based on salts of molybdenum. Unfortunately, it has been found that cis contents above 90% cannot be obtained in a reproducible polymerisation reaction. In all probability, both the polymerisation process and also the cis content of the polymers are greatly effected by the purity of the monomer. However, the aforementioned patent specification does not contain any details regarding the purity of the monomer.

This invention relates to a process for the polymerisation with ring-opening of cyclopentene in which cyclopentene is polymerised optionally in an inert organic solvent at temperatures of from −80 to +60° C. with a catalyst of (h) a rhenium compound and (b) an organo aluminum compound.

In this polymerisation cis-polypentenamers with a content of cis-linkages from 90 to 96% and preferably from 94 to 96% are obtained. These cis-polypentenamers are rubber-like products which show outstanding properties at low temperatures. They consist essentially of recurring structural units of the formula $$-CH_2-CH_2-\overset{H}{\underset{|}{C}}=\overset{H}{\underset{|}{C}}-CH_2-$$

in which the hydrogen atoms of the double bond are in the cis-configuration. They have a molecular weight of from about $2.10^4$ to $3.10^6$. These products also constitute an object of the invention.

The invention also relates to a catalyst for the production of cis-polypentenamer which constitutes a reaction product of a rhenium compound and an organo aluminum compound obtained by reacting the two components in an inert solvent at temperatures of from −60 to +60° C.

Rhenium compounds which are particularly suitable for use in the new process include, in particular, the halides and oxyhalides of rhenium such as $ReCl_3$, $ReCl_5$, $ReOCl_4$ or $ReBr_3$.

Examples of suitable organo aluminum compounds include aluminum trialkyls such as $(C_2H_5)_3Al$, $(i-C_4H_9)_3Al$, aluminum halogen alkyls such as $(C_2H_5)_2AlCl$, $$(C_2H_5)_3Al_2Cl_3$$

$(C_2H_5)AlBr_2$, and alkoxy aluminum alkyls such as $(C_2H_5)_2AlOC_2H_5$. Chlorine and bromine are preferred halogens, whilst alkyl radicals and alkoxy radicals are preferably those containing from 1 to 6 carbon atoms.

To prepare the catalyst, the catalyst components may be used in the following molar ratios:

rhenium compound:organo aluminum
compound=1:0.8 to 15

From 0.1 to 20 millimols and preferably from 0.2 to 6 millimols of rhenium compound are preferably used per 100 g. of monomer in the polymerisation reaction.

Polymerisation may be carried out in an excess of the monomer or in an inert solvent.

Solvents suitable for use in the process include aliphatic hydrocarbons such as butane, pentane, hexane, iso-octane or cycloaliphatic hydrocarbons such as cyclohexane, aromatic hydrocarbons such as benzene, toluene or xylene or halogenated hydrocarbons such as chloroform or chlorobenzene. It is possible to use, for example, from 5 to 50% solutions of cyclopentene in the above mentioned solvents for the process. It is preferred to operate at monomer concentrations of from 10 to 30%.

The catalyst may be prepared at temperatures in a range from −60 to +60° C.

To prepare the catalyst, the rhenium compound and organo aluminum compound are reacted with one another in the required quantities in an inert solvent, for example one of the above solvents, at temperatures of from −60 to +60° C. The catalyst solution thus obtained may be used directly. Preferably, the solvent used in the preparation of the catalyst is the same as that used for polymerisation.

For polymerisation, the catalyst solution may be mixed with a solution of cyclopentene in a suitable solvent, for example in one of the above mentioned solvents. Air and moisture should be excluded. Polymerisation takes place spontaneously at temperatures of from −80 to +60° C.

In a preferred embodiment of the process, the rhenium compound is initially suspended or dissolved in the monomer solution, and then the organo aluminum component is added. Polymerisation begins immediately after the organo aluminum compound has been added. The polymerisation temperature may be in the range from −80 to +60° C. and preferably in the range from −40 to +30° C. Polymerisation usually takes between 1 and 5 hours. After the required conversion has been obtained, polymerisation is stopped for example by the addition of alcohols, carboxylic acids and/or amines. One of the usual stabilisers and age-resistors such as for example phenyl-$\beta$-naphthyl amine, 2,6-di-tert.-butyl-4-methylphenol or 2,2′ - dihydroxy-3,3′-di-tert.-butyl-5,5′-dimethyl diphenyl methane, may be added to the polymer solution in quantities of from 0.2 to 3%.

The polymer can be isolated by known methods, for example with steam or by precipitation with an alcohol. The products obtained in accordance with the invention almost all of the double bonds of which are in the cis-configuration are rubber-like polymers with outstanding behaviour at low temperatures.

The cis-bond content of the cis-polypentenamers obtained is determined from the infra-red spectrum in accordance with the formula:

$$\text{Percent cis} = \frac{\frac{1}{6} \cdot E \text{ cis}}{\frac{1}{6} \cdot E \text{ cis} + \frac{1}{10} E \text{ trans}}$$

The absorption band of the trans-bonds (E trans) is at 965 cm.$^{-1}$, whilst that of the cis-bonds (E cis) is at 719 cm.$^{-1}$.

EXAMPLE 1

2 ml. of triisobutyl aluminum are added at −30° C. to 1.1 g. of rhenium (V) chloride in 20 ml. of cyclopentene, and the reaction mixture is kept at −20° C. for 4 hours.

Polymerisation is then stopped by adding a solution of 1.5 ml. of tri-n-butyl amine in 20 ml. of toluene which also contains 0.5 g. of 2,2'-dihydroxy-3,3'-di-tert.-butyl-5,5'-dimethyl diphenyl methane, followed by precipitation with alcohol. The polymer is dried in a vacuum drying oven at 50° C. until it is constant in weight.

Yield: 3 g. cis-content (determined by infra-red spectroscopy): 94%.

EXAMPLE 2

50 ml. of cyclopentene are added to 364 mg. of rhenium (V) chloride in 50 ml. of chlorobenzene. 1 ml. of a 1 m-solution of tert. butyl-hypochlorite in chlorobenzene is initially added at −35° C., followed by the addition of 1.7 ml. of a 1 m-solution of triisobutyl aluminium in heptane. After a reaction time of 2 hours at −35° C., the reaction product is worked up as in Example 1.

Yield: 1.5 g. cis-content: more than 90%.

EXAMPLE 3

1.03 g. of rhenium (V) chloride are suspended in 65 ml. (50 g.) of cyclopentene, and 1.14 ml. of triisobutyl aluminium added to the resulting suspension at −40° C. After a polymerisation time of 4 hours at −35° C., the yield is 4.5 g.

The polymer contains 1 double bond per monomer unit. According to the infra-red spectrum, the cis-content amounts to 96% and the trans-content to 4%.

EXAMPLE 4

0.75 ml. of diethyl aluminium chloride are added at −40° C. to a suspension of 1.03 g. of rhenium (V) chloride in 65 ml. (50 g.) of cyclopentene, after which the reaction mixture is kept at −35° C. for a period of 3 hours. It is then worked up as in Example 1.

Yield: 5.2 g. cis-content: 90%.

COMPARISON EXAMPLE 20 ml. of toluene and 65 ml. of cyclopentene are introduced in the absence of air and moisture into a flask equipped with a stirrer after which the contents of the flask are cooled to −30° C. This is followed by the addition of 0.54 g. of molybdenum (V) chloride. After 20 minutes' stirring, at most 10% of the molybdenum salt has dissolved. 0.5 ml. of aluminum triisobutyl (100%) are then added followed by 5 hours' stirring at −30° C. After precipitation with alcohol, 3 g. of a tacky polymer are obtained 70% of the double bonds of which are in cis-configuration.

It was not possible to obtain a polymer at a polymerisation temperature of −70° C.

If toluene is replaced as solvent by chlorobenzene in which the molybdenum (V) chloride dissolves much more readily, with the procedure otherwise unchanged, a rubber-like polymer is obtained at −30° C. and at −70° C. Only about 50% of the double bonds of this polymer are in the cis-configuration.

We claim:
1. A process for polymerizing cyclopentene with ring-opening which comprises contacting cyclopentene with a catalyst of (a) a halide or oxyhalide of rhenium and (b) aluminum trialkyl, aluminum halogen alkyl or alkoxy aluminum alkyl at a temperature between −80 and −60° C. and recovering resulting polymer.
2. The process of claim 1 wherein said polymerizing is effected in an inert organic solvent.
3. The process of claim 1 wherein said catalyst is present in an amount of from 0.1 to 20 mMol per 100 g. of cyclopentene.
4. The process of claim 1 wherein component (a) of said catalyst is $ReCl_3$, $ReBr_3$ or $ReCl_5$.
5. The process of claim 1 wherein component (a) of said catalyst is $ReOCl_4$.
6. The process of claim 1 wherein component (b) of said catalyst is trialkyl aluminum.
7. The process of claim 1 wherein component (b) of said catalyst is $(C_2H_5)_3Al$ or $(i-C_4H_9)_3Al$.
8. The process of claim 1 wherein component (a) and component (b) are present in a molar ratio of 1:0.8 to 1:15.

References Cited

UNITED STATES PATENTS

| | | | |
|---|---|---|---|
| 3,412,174 | 11/1968 | Kroll | 260—683.9 |
| 3,458,489 | 7/1969 | Natta et al. | 260—93.1 |
| 3,476,728 | 11/1969 | Natta et al. | 260—93.1 |

FOREIGN PATENTS

| | | | |
|---|---|---|---|
| 1,117,318 | 6/1968 | Great Britain | 260—429 |

JAMES A. SEIDLECK, Primary Examiner

R. A. GAITHER, Assistant Examiner

U.S. Cl. X.R.

252—429